United States Patent
Yanobe et al.

(10) Patent No.: US 10,262,435 B2
(45) Date of Patent: Apr. 16, 2019

(54) SURVEYING INSTRUMENT

(71) Applicant: TOPCON CORPORATION, Tokyo (JP)

(72) Inventors: Satoshi Yanobe, Tokyo (JP); Kaoru Kumagai, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 0 days.

(21) Appl. No.: 15/718,702

(22) Filed: Sep. 28, 2017

(65) Prior Publication Data
US 2018/0137650 A1 May 17, 2018

(30) Foreign Application Priority Data

Nov. 15, 2016 (JP) .................................. 2016-222425

(51) Int. Cl.
| | |
|---|---|
| H04N 9/47 | (2006.01) |
| H04N 7/18 | (2006.01) |
| G06T 7/73 | (2017.01) |
| G06T 7/80 | (2017.01) |
| G01C 11/02 | (2006.01) |
| G01C 15/00 | (2006.01) |
| G01C 25/00 | (2006.01) |

(52) U.S. Cl.
CPC ............... *G06T 7/74* (2017.01); *G01C 11/02* (2013.01); *G01C 15/002* (2013.01); *G01C 25/00* (2013.01); *G06T 7/80* (2017.01)

(58) Field of Classification Search
None
See application file for complete search history.

(56) References Cited

U.S. PATENT DOCUMENTS

| | | | | |
|---|---|---|---|---|
| 10,107,624 B2 * | 10/2018 | Hinderling | ............... | G01C 3/08 |
| 2008/0163504 A1 * | 7/2008 | Smith | .................... | G01C 17/30 |
| | | | | 33/268 |
| 2015/0042790 A1 * | 2/2015 | Hinderling | ............... | G01C 3/08 |
| | | | | 348/135 |
| 2016/0138919 A1 * | 5/2016 | Green | ..................... | G06T 17/00 |
| | | | | 348/135 |
| 2018/0137650 A1 * | 5/2018 | Yanobe | ................... | G01C 11/02 |

FOREIGN PATENT DOCUMENTS

JP        2009-300386 A        12/2009

\* cited by examiner

*Primary Examiner* — Talha M Nawaz
(74) *Attorney, Agent, or Firm* — Roberts Mlotkowski Safran Cole & Calderon, P.C.

(57) ABSTRACT

To provide a surveying instrument capable of evaluating tracking performance without using a device other than the surveying instrument. In order to attain the object described above, a surveying instrument includes a tracking section that detects a position of a target from a shot image, a virtual target position calculating section, a virtual tracking section that converts a position of a virtual target as if it was captured by the tracking section, a tracking arithmetic section that handles an output of the virtual tracking section the same as an output of the tracking section and determines rotational movements of a horizontal shaft and a vertical shaft, a motor control section, motors that rotate the horizontal shaft and the vertical shaft, and encoders that detect rotation amounts of the horizontal shaft and the vertical shaft.

4 Claims, 6 Drawing Sheets

SURVEYING INSTRUMENT

TECHNICAL FIELD

The present invention relates to a surveying instrument having an automatic tracking function.

BACKGROUND ART

A surveying instrument, for example, a motor drive total station has a function to automatically track a moving target. This surveying instrument is provided with a light emitting section that irradiates tracking light and a light receiving section that receives reflected light of the tracking light, and acquires a lit image and an unlit image and obtains a difference between them, and detects a position with a deviation falling within a certain value from a visual axis of a telescope, as a target position (Patent Literature 1).

Performance of the tracking function described above is evaluated by attaching a target to a tool capable of being rotationally moved and reciprocated and making the surveying instrument track movement of the target, or placing the surveying instrument on a rotatable and tiltable table and operating it to track a fixed target.

CITATION LIST

Patent Literature

Patent Literature 1: Japanese Published Unexamined Patent Application Publication No. 2009-300386

SUMMARY OF THE INVENTION

Technical Problem

However, the performance evaluation described above needs a large-sized device for a constant movement to be performed, such as a tool to move a target and a table to move a surveying instrument, in any case, in addition to the surveying instrument.

An object of the present invention is to provide a surveying instrument capable of evaluating tracking performance without using a device other than the surveying instrument.

Solution to Problem

In order to solve the above-described problem, a surveying instrument according to an aspect of the present invention includes a tracking section that detects a position of a target from a shot image, a virtual target position calculating section that creates a position of a virtual target, a virtual tracking section that converts the position of the virtual target created by the virtual target position calculating section as if it was captured by the tracking section, a tracking arithmetic section that handles an output of the virtual tracking section the same as an output of the tracking section, and determines rotational movements of a horizontal shaft and a vertical shaft, a motor control section that generates a control signal from an output of the tracking arithmetic section, a motor that rotates the horizontal shaft and the vertical shaft in response to the control signal of the motor control section, and an encoder that detects rotation amounts of the horizontal shaft and the vertical shaft.

In the aspect described above, it is also preferable that the virtual target position calculating section updates the position of the virtual target by using polar coordinates or three-dimensional coordinates, and when the virtual target is present in a virtual field of view set in advance of a telescope, the virtual tracking section calculates a deviation from a center of the virtual field of view to the virtual target.

In the aspect described above, it is also preferable that to correct a deviation in control period between the tracking section and the virtual tracking section, the virtual tracking section creates a time-series data table of data output by the virtual tracking section, and outputs data corresponding to the time of data acquisition of the tracking section out of the time-series data to the tracking arithmetic section.

In the aspect described above, it is also preferable that the virtual target position calculating section creates, as a movement pattern of the virtual target, at least any one of a pattern in which the virtual target reciprocates in the horizontal direction, a pattern in which the virtual target reciprocates on a tilt, a pattern in which the virtual target rotates for a long period of time, and a pattern in which the virtual target has predetermined vibration.

Effect of the Invention

According to the surveying instrument of the present invention, the tracking performance can be evaluated without using a device other than the surveying instrument.

DESCRIPTION OF EMBODIMENTS

Next, a preferred embodiment of the present invention is described with reference to the drawings.

Figure 1:
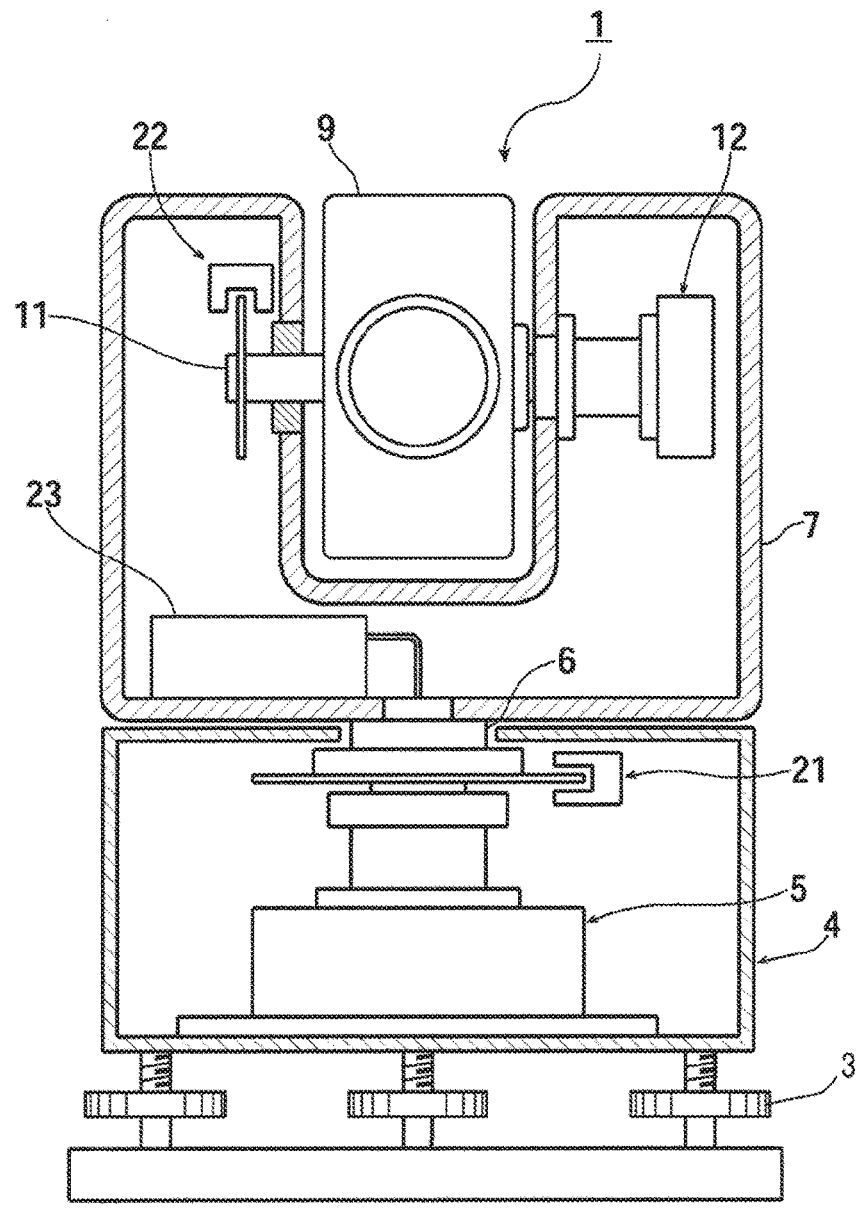
FIG. 1 is a schematic longitudinal sectional view of a surveying instrument according to the present embodiment.

FIG. 1 is a schematic longitudinal sectional view of a surveying instrument according to the present embodiment. The reference sign 1 denotes a surveying instrument. The surveying instrument 1 includes a base portion 4 provided on a leveling section 3, a bracket portion 7 that rotates horizontally around a vertical shaft 6 on the base portion 4, and a telescope 9 that rotates vertically around a horizontal shaft 11 in the bracket portion 7. By collaboration of horizontal rotation of the bracket portion 7 and vertical rotation of the telescope 9, distance measuring light and tracking light are irradiated onto a target.

A motor 5 for horizontal rotation is provided at a lower end portion of the vertical shaft 6, and an encoder 21 for horizontal angle detection is provided at an upper end portion. A motor 12 for vertical rotation is provided at one end portion of the horizontal shaft 11, and an encoder 22 for vertical angle detection is provided at the other end portion. The encoders 21 and 22 are absolute encoders or incremental encoders.

Figure 2:
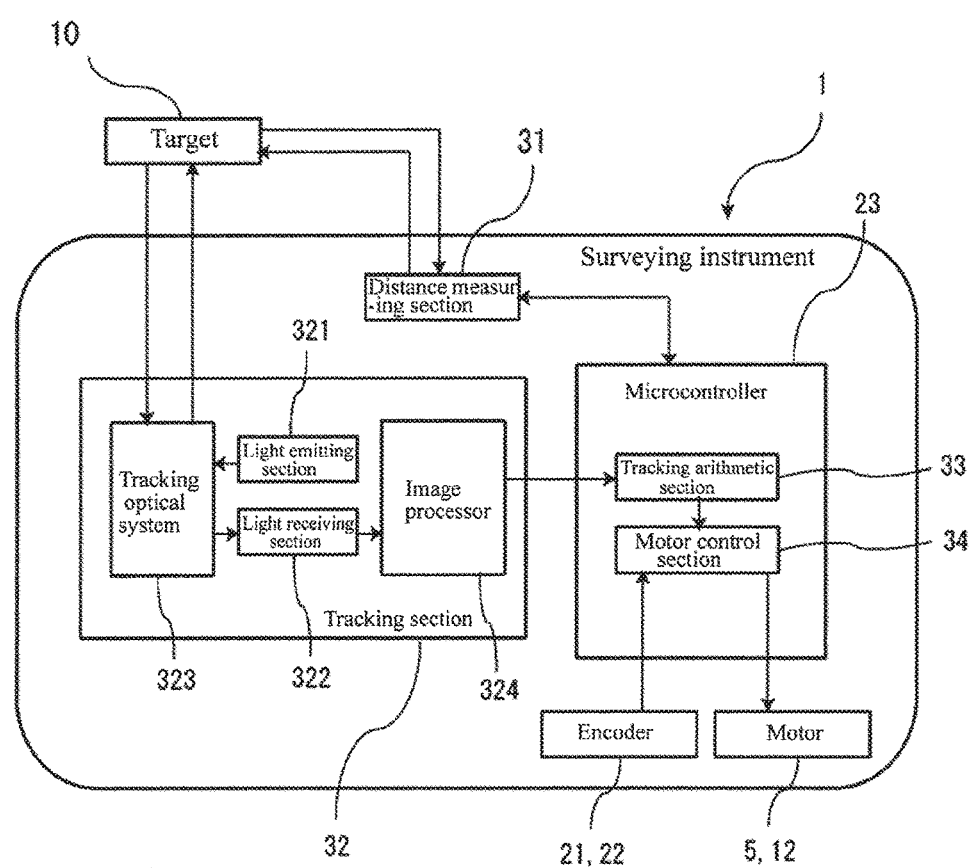
FIG. 2 is a control block diagram of the surveying instrument according to the present embodiment.

FIG. 2 is a control block diagram of the surveying instrument 1 according to the present embodiment. The surveying instrument 1 includes a distance measuring section 31, a tracking section 32, a microcontroller 23, the motors 5 and 12 described above, and the encoders 21 and 22 described above. The distance measuring section 31 transmits infrared pulsed laser light as distance measuring light to a target 10. Then, reflected light from the target 10 is received by a light receiving section, for example, a photodiode, etc., and converted into a distance measuring signal. The tracking section 32 outputs, as tracking light, infrared laser light with a wavelength different from that of the distance measuring light from the light emitting section 321. The tracking light is transmitted to the target 10 via a tracking optical system 323, reflected by the target, and enters the light receiving section 322 via the tracking optical system 323 again. The light receiving section 322 is an image sensor, for example, a CCD sensor, a CMOS sensor, etc. In the light receiving section 322, a landscape image (lit image) including the tracking light and a landscape image (unlit image) excluding the tracking light are acquired. Both of these images acquired by the light receiving section 322 are transmitted to an image processor 324, and a difference between these images is obtained. By obtaining the difference, a center of an image of the target 10 is obtained. The image processor 324, on the image, obtains deviations ($\Delta H$, $\Delta V$) between a center of a field of view of the telescope 9 and the center of the target 10, and outputs these to the microcontroller 23.

The microcontroller 23 includes a CPU, a ROM, and a RAM, etc., mounted on an integrated circuit, and is accommodated in the bracket portion 7 (FIG. 1). The microcontroller 23 includes a tracking arithmetic section 33, a motor control section 34, and a virtual target position calculating section 35 and a virtual tracking section 36 that are described in detail below.

The tracking arithmetic section 33 determines rotational operations of the motors 5 and 12 from the outputs ($\Delta H$, $\Delta V$) of the tracking section 32. The motor control section 34 generates control signals for the motors 5 and 12 from the outputs of the tracking arithmetic section 33. The motors 5 and 12 that received the control signals respectively rotate the vertical shaft 6 and/or the horizontal shaft 11 to positions corresponding to the outputs ($\Delta H$, $\Delta V$) from the tracking section 32. The encoders 21 and 22 respectively detect rotation angles of the vertical shaft 6 and the horizontal shaft 11, and feeds-back these to the motor control section 34. In the surveying instrument 1, automatic tracking is performed until a position at which deviations between the center of the field of view of the telescope 9 and the center of the target 10, fall within certain values, is detected as a position of the target 10.

Figure 3:
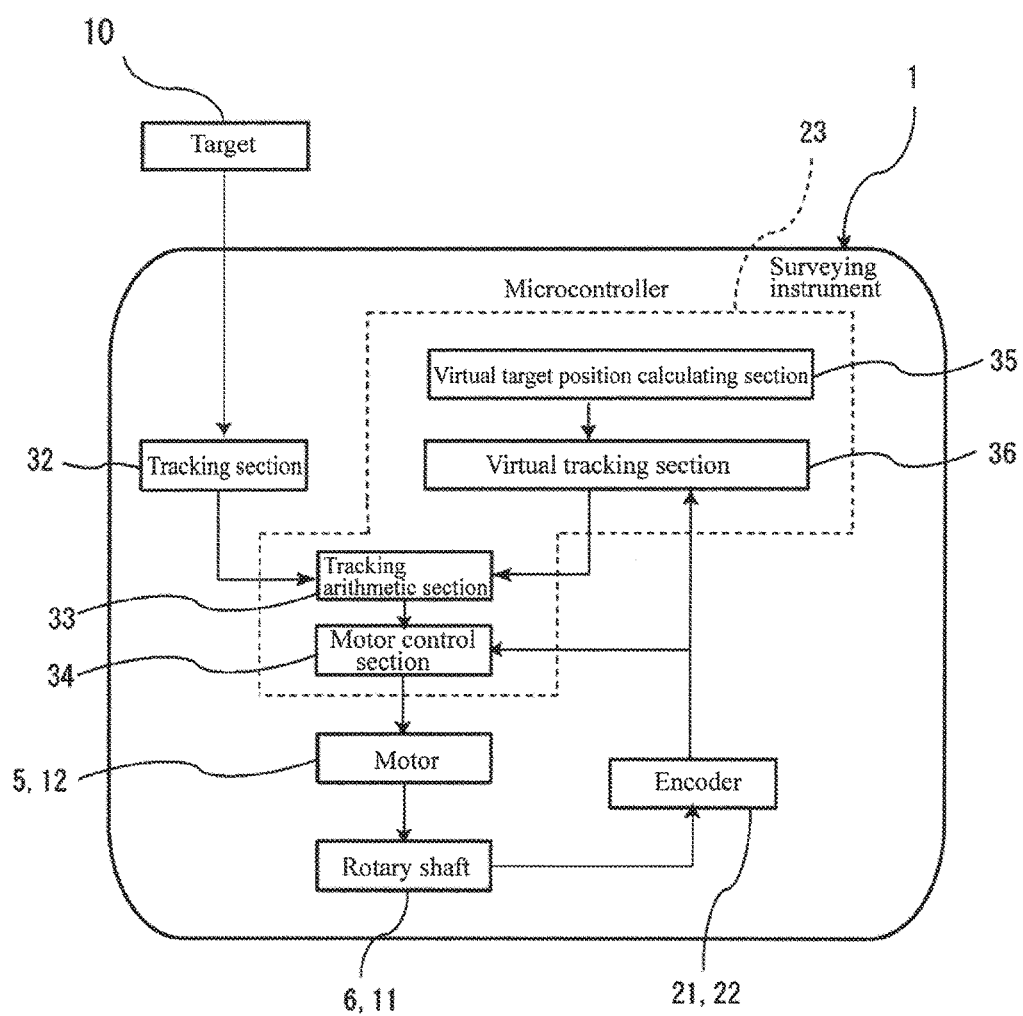
FIG. 3 is a control block diagram relating to virtual tracking of the surveying instrument according to the present embodiment.

Further, the surveying instrument 1 has a virtual tracking function. FIG. 3 is a control block diagram relating to virtual tracking of the surveying instrument 1 according to the present embodiment.

The virtual target position calculating section 35 creates a position of a virtual target 10' at polar coordinates (Dt, Vt, Ht) or three-dimensional coordinates (X, Y, Z), and updates it momentarily.

Figure 4:
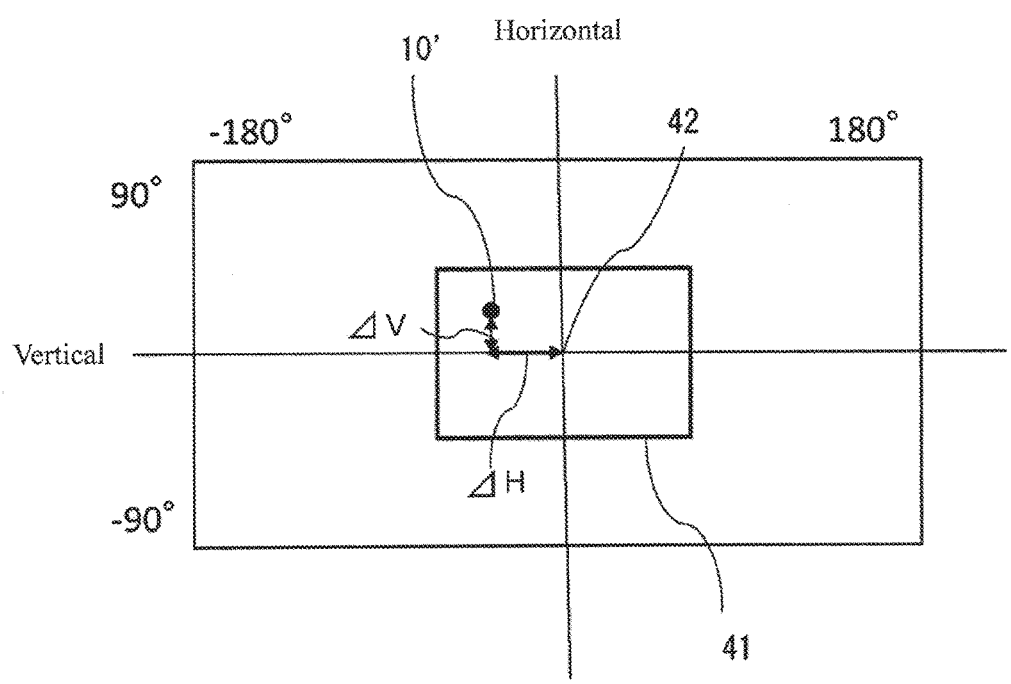
FIG. 4 is an image figure for describing processing of a virtual tracking section according to the present embodiment.

In the virtual tracking section 36, as shown in FIG. 4, a virtual field of view 41 of the telescope 9 is set in advance by polar coordinates (Dt, Vt, Ht) or three-dimensional coordinates (X, Y, Z). First, the virtual tracking section 36 investigates a horizontal angle and a vertical angle of the virtual target 10' and a virtual view angle, and investigates whether the virtual target 10' is present in the virtual field of view 41. When the virtual target 10' is present in the virtual field of view 41, a deviation ($\Delta H$) in the horizontal direction and a deviation ($\Delta V$) in the vertical direction from a center 42 of the virtual field of view 41 to a center of the virtual target 10' are obtained, and are output to the tracking arithmetic section 33. Thus, the virtual tracking section 36 spatially converts the position of the virtual target created by the virtual target position calculating section 35 as if it was captured by the tracking section 32.

Figure 5:
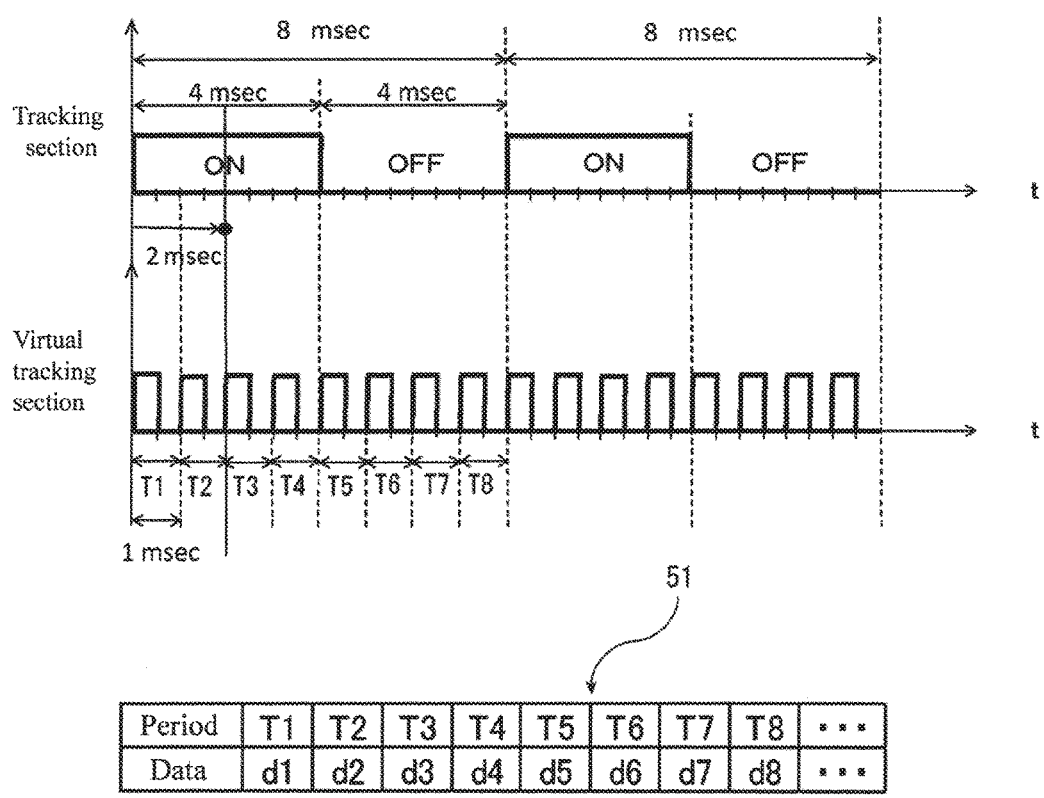
FIG. 5 is a timing chart of a tracking section and the virtual tracking section according to the present embodiment.

Here, preferably, in consideration of actual resolution and delay characteristics of the virtual tracking section 36 relative to the tracking section 32, the virtual tracking section 36 performs temporal conversion as well. FIG. 5 is a timing chart of the tracking section 32 and the virtual tracking section 36 according to the present embodiment.

The emission pulse output of the light emitting section 321 of the tracking section 32 is performed so that, for example, a light emitting time is 4 [msec] and a turning-off time is 4 [msec], and therefore, a control period of the tracking section 32 is 8 [msec]. In the light receiving section 322, a lit image is shot at an average position in the light emitting time, so that, a position of the target 10 is acquired as if it is detected at a position of 2 [msec] in the light emitting time. This 2 [msec] is a delay of the light receiving section 322. In the tracking section 32, one set is 8 [msec], so that once per 8 [msec], deviations ($\Delta H$, $\Delta V$) between the center of the virtual field of view of the telescope 9 and the center of the target 10 are output to the tracking arithmetic section 33.

On the other hand, the virtual tracking section 36 performs processing on software, so that data can be acquired according to performance of the CPU of the microcontroller 23. In a case where the control period of the CPU is, for example, 1 [msec], the virtual tracking section 36 can output deviations ($\Delta H$, $\Delta V$) between the center 42 of the virtual field of view 41 and the center of the virtual target 10' to the tracking arithmetic section 33 every 1 [msec].

Here, to correct a difference in resolution between the tracking section 32 and the virtual tracking section 36, the virtual tracking section 36 creates a time-series data table 51 (FIG. 5) of output data. Data d1, d2, d3 . . . , d8 shown in the time-series data table 51 are output data ($\Delta H$, $\Delta V$) obtained in the respective control periods T1, T2, T3 . . . , T8 of the virtual tracking section 36 shown in FIG. 5. In this example, the virtual tracking section 36 outputs to the tracking arithmetic section 33 not latest data d8 but data d2 that is data 6 [msec] ago, corresponding to the time of data acquisition of the tracking section 32. Thus, by outputting data of the virtual tracking section 36 in periods equal to the actual control periods of the tracking section 32, the virtual tracking section 36 can accurately reproduce actual operation of the tracking section 32.

The tracking arithmetic section 33 handles the outputs ($\Delta H$, $\Delta V$) from the virtual tracking section 36 the same as actual outputs from the tracking section 32, and determines rotational operations of the motors 5 and 12. The motor control section 34 generates control signals for the motors 5 and 12 from outputs of the tracking arithmetic section 33. The motors 5 and 12 that received the control signals rotate the vertical shaft 6 and/or the horizontal shaft 11 to positions corresponding to the outputs ($\Delta H$, $\Delta V$) from the virtual tracking section 36, respectively. The encoders 21 and 22 respectively detect rotation angles of the vertical shaft 6 and the horizontal shaft 11, and feeds-back these to the motor control section 34. In the surveying instrument 1, automatic tracking is virtually performed until a position at which deviations between the center of the virtual field of view 41 and the center of the virtual target 10' fall within certain values is detected as a position of the virtual target 10'.

Figure 6:
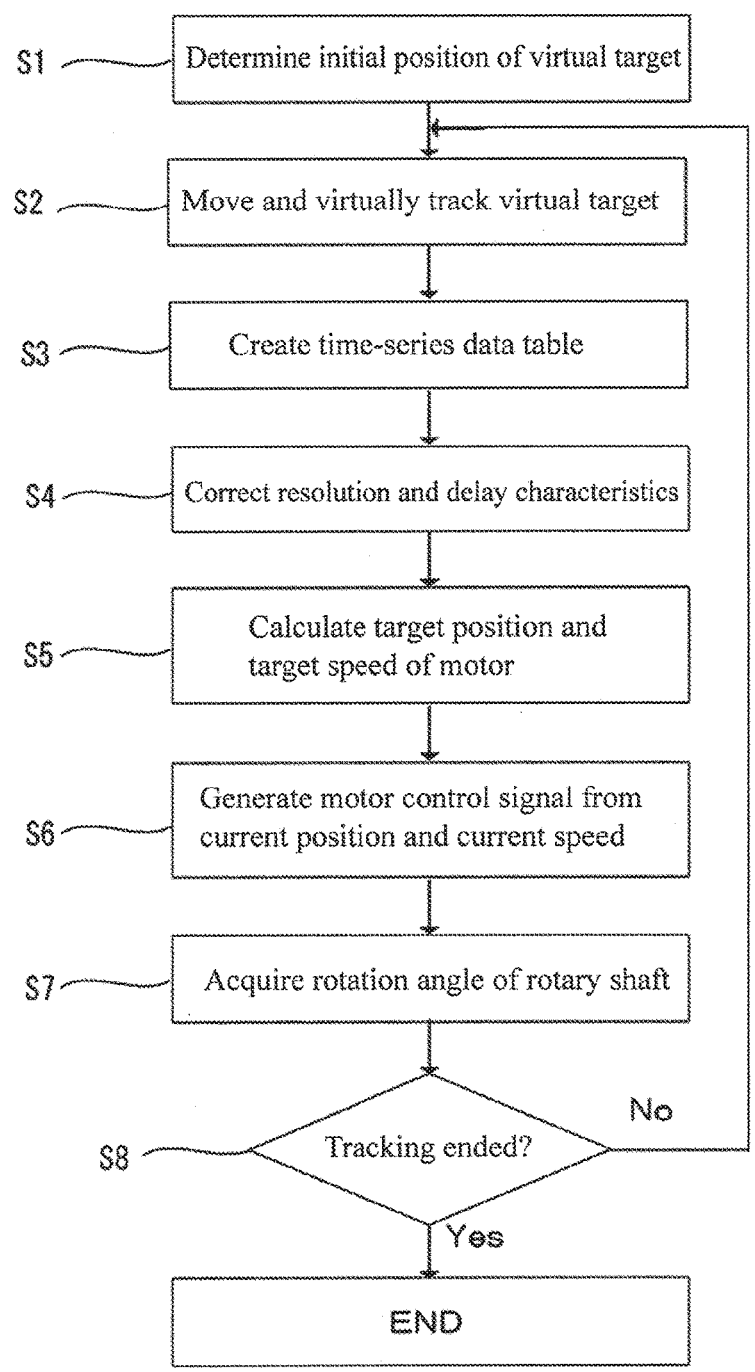
FIG. 6 is a control flowchart of virtual tracking of the surveying instrument according to the present embodiment.

FIG. 6 is a control flowchart of virtual tracking of the surveying instrument 1 according to the present embodiment.

First, in Step S1, the virtual target position calculating section 35 detects a direction that the telescope 9 faces at the time of start from the encoders 21 and 22, acquires an installation planned distance of the target 10 from an input, etc., and determines an initial position of the virtual target 10'.

Next, in Step S2, the virtual target position calculating section 35 moves the virtual target 10' and updates the virtual position. The virtual tracking section 36 virtually tracks the virtual target 10'.

Next, in Step S3, the virtual tracking section 36 creates a time-series data table 51 of output data.

Next, in Step S4, the virtual tracking section 36 corrects resolution and delay characteristics relative to the tracking section 32.

Next, in Step S5, the tracking arithmetic section 33 calculates rotational operations of the motors 5 and 12 (target positions and target speeds of the motors 5 and 12).

Next, in Step S6, the motor control section 34 generates control signals from current positions and current speeds of the motors 5 and 12.

Next, in Step S7, the encoders 21 and 22 acquire rotation angles of the vertical shaft 6 and the horizontal shaft 11.

Next, in Step S8, the tracking arithmetic section 33 judges whether tracking has ended. When tracking does not end, the process returns to Step S2. When tracking ends, virtual tracking is stopped. The Step S4 described above is not an essential element for the virtual tracking control flow, however, it is preferable to perform Step 4.

Movement patterns of the virtual target 10' in Step S2 may be programmed in advance, and an operator can arbitrarily select a pattern. Pattern examples are shown as follows.

Pattern 1 is a pattern in which the virtual target 10' is installed ahead on the visual axis direction (for example, polar coordinate Dt=10 m) of the surveying instrument 1, and the virtual target 10' is reciprocated in the horizontal direction (the polar coordinate Ht is changed) (for example, with a motor pulse of 10 Hz). The Pattern 1 is a pattern simulating conventional evaluation of tracking performance using a tool.

Pattern 2 is a pattern in which the virtual target 10' is installed ahead on the visual axis direction (for example, the polar coordinate Dt=10 m) of the surveying instrument 1, and a horizontal angle or a vertical angle of the virtual target 10' is increased or decreased (the polar coordinate Ht or Vt is changed) (for example, with a motor pulse of 10 Hz). The Pattern 2 is a pattern simulating conventional evaluation of tracking performance using a table.

Pattern 3 is a pattern in which the virtual target 10' is installed ahead on the visual axis direction (for example, three-dimensional coordinate Y=10 m) of the surveying instrument 1, and the virtual target 10' is rotated at a predetermined constant angular velocity for a long period of time (three-dimensional coordinates X and Z are changed) (for example, with a motor pulse of 10 Hz). The Pattern 3 is a pattern simulating evaluation of continuous use in which the target 10 is fixed to a certain rotary disk, and the rotary disk is rotated at a predetermined constant angular velocity for a long period of time.

Pattern 4 is a pattern in which predetermined vibration is applied to the virtual target 10' (for example, in the Z direction of a three-dimensional coordinate system). With this pattern, tracking performance when the target 10 is loaded onto heavy machinery can be evaluated.

According to the surveying instrument 1 of the present embodiment, movement of a virtual target is calculated by the virtual target position calculating section 35, and processing as if the tracking section 32 captured the target is performed by the virtual tracking section 36, so that tracking performance can be evaluated inside the surveying instrument 1. Therefore, a large-sized device such as a tool to move a target and a table to move a surveying instrument which was used for conventional evaluation of tracking performance, becomes unnecessary.

Further, according to the surveying instrument 1 of the present embodiment, tracking performance can be evaluated by the surveying instrument 1 alone, so that it becomes unnecessary to prepare facilities for evaluation of tracking performance. Therefore, tracking performance can be evaluated at an arbitrary location other than a factory, such as a survey site or a business office. In particular, evaluation of tracking performance in a frigid or extremely hot environment can be realized by placing only the surveying instrument in this environment, so that it becomes easier to arrange the facilities and environment than conventionally. In addition, the surveying instrument 1 according to the present embodiment can also be used for performance simulation of a tracking sensor under development by changing the sensor specifications of the virtual tracking section 36.

An embodiment of a preferred surveying instrument of the present invention is described above, and it can be modified based on the knowledge of a person skilled in the art, and such a modification is also included in the scope of the present invention.

REFERENCE SIGNS LIST

1 Surveying instrument
5 Horizontal rotary motor
6 Vertical shaft
9 Telescope
10 Target
11 Horizontal shaft
12 Vertical rotary motor
21 Horizontal angle detection encoder
22 Vertical angle detection encoder
23 Microcontroller
32 Tracking section
33 Tracking arithmetic section
34 Motor control section
35 Virtual target position calculating section
36 Virtual tracking section
41 Virtual field of view
42 Center of virtual field of view
51 Time-series data table

The invention claimed is:
1. A surveying instrument comprising:
a horizontal shaft for rotating a telescope of the surveying instrument vertically;
a vertical shaft for rotating the telescope horizontally;
a microcontroller having
a tracking section that includes an image sensor and an image processor, obtains a center of an image of a target by lit and unlit images of the image sensor, and obtains and outputs deviations between a center of a field of view of the telescope and the center of the target, a tracking arithmetic section that makes the horizontal shaft and/or the vertical shaft rotate respectively to positions corresponding to the deviations from the tracking section until a position at which deviations between the center of the field of view of the telescope and the center of the target, fall within certain values, and a motor control section that generates a control signal from an output of the tracking arithmetic section, a virtual target position calculating section that creates a position of a virtual target, and a virtual tracking section, when the virtual target is present in a virtual field of view set in advance of the telescope, calculates and outputs deviations from a center of the virtual field of view to a center of the virtual target;

motors that rotate the horizontal shaft and the vertical shaft in response to the control signal of the motor control section; and encoders that detect rotation amounts of the horizontal shaft and the vertical shaft, and feed-back the amounts to the motor control section, wherein the surveying instrument, for evaluating tracking performance, handles an output of the virtual tracking section the same as an output of the tracking section, and determines rotational movements of the horizontal shaft and the vertical shaft in the tracking arithmetic section.

2. The surveying instrument according to claim 1, wherein the virtual target position calculating section updates the position of the virtual target by using polar coordinates or three-dimensional coordinates, and when the virtual target is present in a virtual field of view set in advance of the telescope, the virtual tracking section calculates a deviation from a center of the virtual field of view to the virtual target.

3. The surveying instrument according to claim 1, wherein to correct a deviation in control period between the tracking section and the virtual tracking section, the virtual tracking section creates a time-series data table of data output by the virtual tracking section, and outputs data corresponding to the time of data acquisition of the tracking section out of the time-series data to the tracking arithmetic section.

4. The surveying instrument according to claim 1, wherein the virtual target position calculating section creates, as a movement pattern of the virtual target, at least any one of a pattern in which the virtual target reciprocates in the horizontal direction, a pattern in which the virtual target reciprocates on a tilt, a pattern in which the virtual target rotates for a long period of time, and a pattern in which the virtual target has predetermined vibration.

* * * * *